United States Patent [19]
Masuda

[11] 3,877,149
[45] Apr. 15, 1975

[54] ACCURACY REGULATING MEANS FOR A LINEAR MICROMETER
[75] Inventor: Minoru Masuda, Kawasaki, Japan
[73] Assignee: Yehan Numata, Yokohama, Japan
[22] Filed: Nov. 12, 1973
[21] Appl. No.: 414,835

Related U.S. Application Data
[63] Continuation-in-part of Ser. No. 200,757, Nov. 22, 1971, abandoned.

[52] U.S. Cl. .................................................. 33/166
[51] Int. Cl. ............................................. G01b 3/18
[58] Field of Search ............ 33/166, 164, 165, 167, 33/163

[56] References Cited
UNITED STATES PATENTS
| | | | |
|---|---|---|---|
| 1,210,051 | 12/1916 | Davenport | 33/166 |
| 3,482,321 | 12/1969 | Inshaw | 33/166 |
| 3,602,998 | 9/1971 | Imai | 33/166 |
| 3,686,766 | 8/1972 | Matumoto | 33/166 |

Primary Examiner—William D. Martin, Jr.
Attorney, Agent, or Firm—Brisebois & Kruger

[57] ABSTRACT

This invention relates to accuracy regulating means for a linear micrometer having a hollow spindle which slides in an outer sleeve. The accuracy regulating means comprises a pin mounted on the inner end of the spindle and a guide which is adjustably mounted in the said outer sleeve, with the pin slidable in a channel in said guide. The micrometer is provided with a conventional lead screw turned by a thimble and engaging internal threads on said spindle.

7 Claims, 3 Drawing Figures

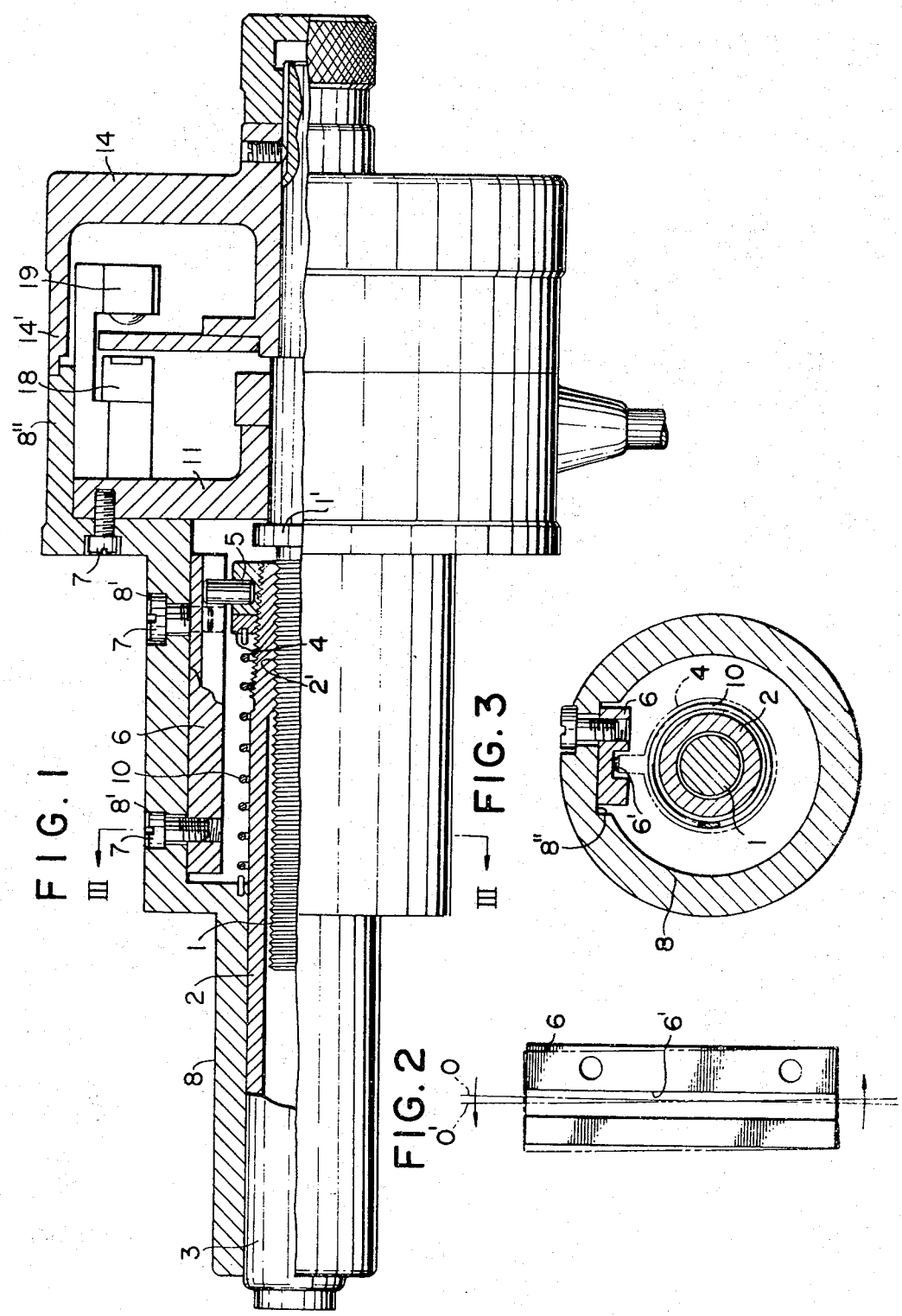

ACCURACY REGULATING MEANS FOR A LINEAR MICROMETER

SUMMARY OF THE INVENTION

This application is a continuation-in-part of my prior application Ser. No. 200,757, filed Nov. 22, 1971, now abandoned.

This invention relates to accuracy regulating means for a linear micrometer.

The chief object of the present invention is to obtain a higher accuracy of measurement by regulating the path of travel of a pin carried by a spindle along an outer sleeve by means of a movable and adjustable guide mounted on the inside of the outer sleeve.

In an ordinary linear micrometer, a guide channel is provided in either the outer sleeve or a spindle and a pin which is slidable in that channel is carried on whichever of the spindle and sleeve is not provided with the channel. But, since the channel occupies a fixed position it has been impossible to compensate for errors in the relative positions of the spindle and sleeve introduced in the course of manufacture and assembly.

A preferred embodiment of my invention will now be described with reference to the accompanying drawing, in which:

FIG. 1 is a side view of my new micrometer with the outer sleeve partially cut away;

FIG. 2 is a plan view of the guide in said micrometer;

FIG. 3 is a sectional view taken along the line III—III in FIG. 1.

The lead screw 1 attached at one end to the thimble 14 turns in threads 2' on the inner surface of a hollow spindle 2 having a measuring part 3 at the outer end thereof. At the inner end of the spindle 2 is a pin 5 which is axially movable in the channel 6' of a guide 6 mounted on a flat portion 8'' of the inner surface of the central portion of an outer sleeve 8. The pin 5 is seated in a nut screwed onto external threads on the spindle 3, and locked in place by a lock-nut 4. The pin may obviously be set in any desired position relative to the spindle. A coil spring 10 encircles the spindle 2 between a shoulder on the inner surface of the outer sleeve 8 and the lock-nut 4, and constantly biasses the pin 5 to one side of the channel 6'. The guide 6 is attached to the outer cylinder by small flat-headed screws 7, but holes 8', 8' through which the screws 7 are inserted, have a diameter greater than the diameter of the threaded portion of the screws 7 and, therefore, the screws 7 may be slightly moved circumferentially of the outer sleeve 8, so that guide 6 is likewise movable.

The lead screw 1 carries a flange 1' which is in rotatable contact with a thrust collar 11 rigidly mounted in the larger diameter portion 8'' of the outer sleeve 8, and one end 14' of the thimble 14 is also in contact with the larger diameter portion 8''. Consequently, the thimble and the lead screw rotate together with respect to the outer cylinder 8. When the lead screw 1 rotates, the spindle 2 threaded onto the lead screw 1, has a tendency to rotate therewith. But the spindle 2 carries the pin 5 which is slidable in the guide channel 6' of the guide 6 and travels along the guide channel 6'.

The movement of the spindle 2 against the outer sleeve is subject to a slight error which is not constant and is caused by errors in the threading of the lead screw and the spindle and looseness in an axial direction. This error may be eliminated and the rate of axial movement of the spindle relative to the outer sleeve may be regulated by changing the angle of the guide channel in which the pin is seated, for example, by changing the angle from 0 to 0' in FIG. 2.

The described embodiment has photoelectric means 18, 19 which measure the rotation of the lead screw and spindle relative to the sleeve. A circular glass plate 12 carried by the spindle is positioned bwtween the light and the receiving cell of this photoelectric means, and a web of thin radiating lines is formed on said glass by the evaporation deposition of chromium thereon.

Of course, the measured values may be read from scales which are graduated on the outer sleeve and on the thimble, as in the case of an ordinary micrometer.

What is claimed is:

1. In a linear micrometer comprising an outer sleeve, a spindle axially slidable within said sleeve, threaded means engaging mating threads on said spindle and rotatably mounted on said outer sleeve, and means for preventing rotation of said spindle within said outer sleeve when said threaded means is rotated, the improved rotation-preventing means which comprises a pin carried by said spindle and projecting radially outward therefrom inside said outer sleeve, a guide member inside said outer sleeve defining a channel extending lengthwise of said spindle and in which said pin is slidable, and adjustable fastening means for retaining said guide in a plurality of different angular positions relative to the axis of said spindle.

2. A micrometer as claimed in claim 1 in which said guide member is adjustable circumferentially of said sleeve.

3. A micrometer as claimed in claim 1 in which said fastening means comprises at least one screw projecting through a hole in said sleeve into a matingly threaded recess in said guide member, the hole in said sleeve being larger in diameter than the portion of said screw passing through said hole.

4. A micrometer as claimed in claim 1 in which said pin is adjustably mounted on said spindle.

5. A micrometer as claimed in claim 1 in which said threaded means and outer sleeve carry cooperating indicia, the relative position of which is indicative of the axial position of said spindle in said outer sleeve.

6. A micrometer as claimed in claim 1 comprising resilient means biasing said pin against one side of said channel.

7. A micrometer as claimed in claim 1 comprising photoelectric means carried by said sleeve and graduated translucent means carried by said threaded means in alignment with said photoelectric means to permit detection of movement of said threaded means and spindle relative to said sleeve.

* * * * *